United States Patent [19]

Beckwith et al.

[11] Patent Number: 5,422,722
[45] Date of Patent: Jun. 6, 1995

[54] ANGULAR RANDOM WALK SCREENING FIXTURE

[75] Inventors: Timothy A. Beckwith, Coon Rapids; Gerald J. Showalter, St. Paul, both of Minn.

[73] Assignee: Honeywell Inc., Minneapolis, Minn.

[21] Appl. No.: 83,144

[22] Filed: Jun. 25, 1993

[51] Int. Cl.⁶ .................................................. G01C 19/68
[52] U.S. Cl. ........................................ 356/350; 372/94
[58] Field of Search ............................. 356/350; 372/94

[56] References Cited

U.S. PATENT DOCUMENTS

| | | | |
|---|---|---|---|
| 4,751,718 | 6/1988 | Hanse et al. | 356/350 |
| 4,865,452 | 9/1989 | Ljung et al. | 356/350 |
| 5,088,825 | 2/1992 | Derry et al. | 372/94 |
| 5,116,130 | 5/1992 | Butler | 356/350 |
| 5,173,745 | 12/1992 | Hanse | 372/94 |
| 5,233,406 | 8/1993 | Platt et al. | 372/94 |
| 5,311,538 | 5/1994 | Thorland | 372/94 |

FOREIGN PATENT DOCUMENTS

| | | | |
|---|---|---|---|
| 61-155811 | 7/1986 | Japan | 356/350 |
| 85-03569 | 8/1985 | WIPO | 356/350 |

*Primary Examiner*—Rolf Hille
*Assistant Examiner*—Minhloan Tran
*Attorney, Agent, or Firm*—Craig J. Lervick

[57] ABSTRACT

A screening device can be used to test ring laser gyro performance at numerous points during the gyro assembly. This performance testing can be done without physically attaching electrical connections thereto and at a point prior to the attachment of readout sensors and/or dither motors. This screening device provides a valuable tool in identification of problems related to gyro performance which may be incurred during the assembly of the gyroscope.

15 Claims, 2 Drawing Sheets

ANGULAR RANDOM WALK SCREENING FIXTURE

FIELD OF THE INVENTION

The present invention relates to the screening of ring laser gyroscopes at various points of their assembly to allow for evaluation of performance and identification of production problems. More specifically, the invention provides a fixture for testing a ring laser gyroscope at an early point in its assembly and at various points thereafter.

BACKGROUND OF THE INVENTION

During the production of any device, whether it be a simple or a complex device, there always exists the problem of defects. As the device becomes more and more complicated, it becomes more difficult to control the quality of the products being produced. Furthermore, when producing complex items, there will always exist situations some units perform well and other units do not perform as well. Many times this performance variation is due to factors unknown to the producer of the products, or the known problems are not so severe as to warrant drastic measures being taken.

It is always desirable to screen the bad units from the production line at a point as soon as possible to allow the repair of such units. Alternatively, it may be necessary to pull products which are bad performers from the production line and scrap them. As the device becomes more and more complex, the cost of assembly increases. If units having bad performance characteristics can be caught at a point early on the production line, money can be saved by not furthering the assembly of these units. Furthermore, if problems on a production line can be identified at an early point in time, an appropriate solution may be implemented in a timely fashion.

The ring laser gyroscope is a very complex device used in inertial navigation systems to sense inertial rotation. Ring laser gyroscopes are devices well known in the art which utilize counter propagating optical signals to detect rotation. Further information regarding ring laser gyroscopes can be found in U.S. Pat. No. 3,373,650 to Killpatrick. Because of the complexity of the ring laser gyroscope, production can be very costly and time consuming. Furthermore, performance of a ring laser gyroscope is very important. Many times the gyroscope is required to meet exacting specifications which dictate its performance requirements, power consumption requirements and size requirements.

In order to assure the performance and operation of the ring laser gyroscope, it is necessary to test these units at some point in time. Preferably, the units can be tested to determine their performance at a point early in their assembly. In order to test the performance of a ring laser gyroscope, it is necessary to have all functional elements present. These elements include the laser gyro block having mirrors attached thereto on the appropriate corners, appropriate cathode and anode structures to promote lasing of gas contained within the laser gyro block, and a wedge mirror for directing optical signals out of the laser gyro block. Furthermore, readout sensors are required for detecting optical signals directed from the wedge mirror. Lastly, path length control transducers are required to adjust the optical dimensions of the cavity within ring laser gyro block.

One previous method of screening the ring laser gyro during production involved testing of the gyro after it had been fully assembled. As indicated earlier, it is very costly and time consuming to carry out all these steps of assembly. Further, this time and cost may be wasted if the gyro has performance problems caused by processes or parts incorporated into the gyro at an early point of its assembly.

Another method of screening involved checking certain parameters of the gyro as it was being assembled and attempting to predict performance based upon those tested parameters. For example, once the block was assembled to a point that allowed the gas discharge laser to be operated, the laser intensity was tested at various power levels. Predictions as to gyro performance were then made based on these laser intensity measurements.

SUMMARY OF THE INVENTION

It is an object of the present invention to provide a device upon which a ring laser gyro block can be tested prior to completion of its assembly. It is a further object of the present invention to provide a device which will allow for testing of the ring laser gyro at various points in the progression of its assembly.

Another object of the present invention is to provide a device which allows for testing of actual gyro performance as opposed to estimated performance based on certain measurements.

It is a further object of the present invention to provide a device for identifying possible production problems at a point early in the production of the ring laser gyroscope, thus allowing timely corrective action to be taken.

The gyro screening device of the present invention allows a gyro block to be attached thereto and have its performance tested at a point prior the attachment of readout sensors, dither motors, or electrical connections. As a block is attached to the screening device of the present invention, alignment pins force the gyro block into a predetermined position. Spring loaded pin, or pogo pins, are placed in appropriate positions to make contact with the cathode, electrodes, and PLC drivers. The predetermined positioning of the gyro block provides for the output of a pair of combined optical signals to be projected from a wedge mirror toward a certain predefined position. At this predefined position is located a readout sensor which is attached to an adjustable portion of the screening device. The readout sensor can then be appropriately aligned with the combined optical signals emerging from the wedge mirror and as such, can identify the operational characteristics of the laser gyro block. A second optical sensor (a laser intensity monitor sensor or LIM sensor) is attached to the screening device for receiving a laser intensity monitor (LIM) signal from the wedge mirror. This signal is further helpful in determining and screening the performance of the laser gyro block. Furthermore, the signal output from the LIM sensor is used in the path length control scheme of the ring laser gyro when it is operating.

The laser gyro block undergoing screening is attached to a mounting plate containing all of the above mentioned components. This mounting plate is attached to a stable base unit via a dither motor. As is well known, the dither motor is used to rotationally oscillate the laser gyro block thus reducing the lock-in phenomenon.

Using the screening device of the present invention, it is only necessary to have the mirrors, cathode, anodes, and PLC drivers attached to the laser block. A dither spring, external to the laser block but attached to the screening device, can be used along with readout optics which are also external to the laser block. As the laser gyro proceeds through assembly, the screening device of the present invention can be easily reconfigured to allow testing using an attached dither spring, or attached readout optics, or both.

Appropriate connections are made to the cathode, the anodes, the PLC drivers, the readout sensor, the LIM sensor, and the dither motor which allow these components to be attached to appropriate electrical driving circuits. These circuits include power supplies and control loops allow the laser gyro to block to operate as if it were a completely assembled ring laser gyroscope. Allowing for operation as a fully assembled ring laser gyroscope provides the opportunity to test the performance characteristics of the gyroscope at a point at which the gyro is not fully assembled. As will be recognized, this provides a point for easily identifying problems and for testing the performance characteristics of the ring laser gyroscope.

BRIEF DESCRIPTION OF THE DRAWINGS

Further objects and advantages of the present invention will be seen by reading the following detailed description in conjunction with the drawings in which.

DESCRIPTION OF THE INVENTION

Figure 1:
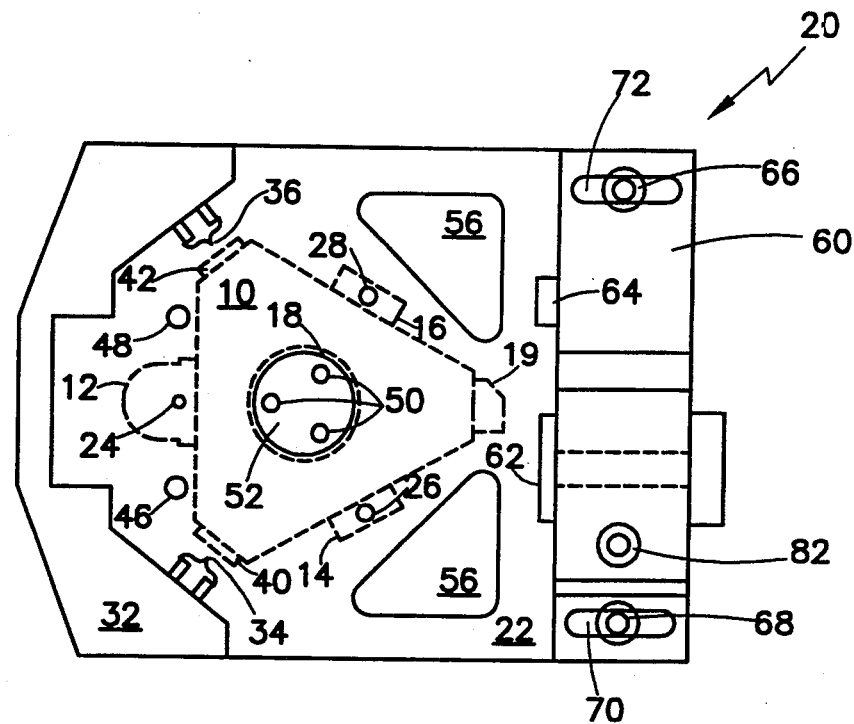
FIG. 1 is a top view of the screening device of the present invention.
Figure 2:
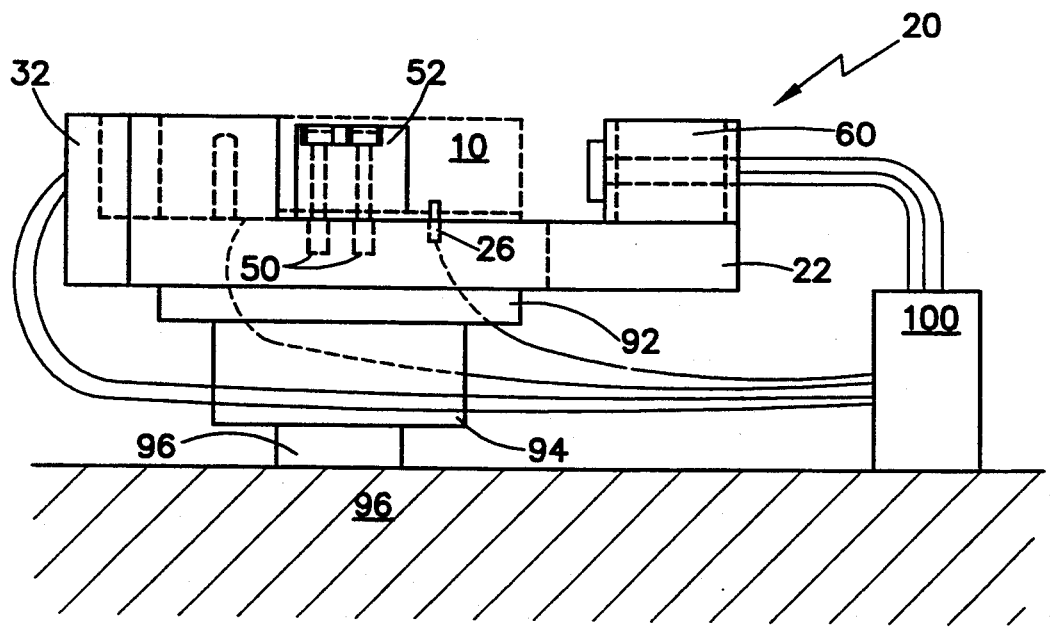
FIG. 2 is a side view of the screening device of the present invention.

Referring now to FIG. 1, there is shown a top view of the screening device 20 of the present invention. Screening device 20 is configured to hold a ring laser gyro block 10 (shown here in dotted lines). Referring to FIG. 2 with continual reference to FIG. 1, there is shown a side view of screening device 20. Screening device 20 is made up of a mounting plate 22 having numerous components attached thereto. More specifically, attached to mounting plate 22 is a cathode pogo pin 24 and two anode pogo pins 26 and 28. These pogo pins, or spring loaded pins, 24, 26 and 28, are comprised of vertical members which are spring loaded such that any compression along their central axis causes compression of the pogo pin. Electrical connection is made between cathode pogo pin 24 and the cathode 12 of ring laser gyro block 10. Similarly, electrical contact is made between first anode pogo pin 26 and first anode 14 as well as second anode pogo pin 28 and a second anode 16. These pogo pins provide the necessary electrical connections to power the gas discharge laser within the ring laser gyro block 10.

At one end of mounting plate 22 exists a vertical structure 32 which is capable of housing further pogo pins. Vertical structure 32 is shown in FIGS. 1 and 2 to be integral with mounting plate 22; however, it is understood that many different configurations could be used to achieve the function of vertical structure 32.

Vertical structure 32 houses a first pair of PLC pogo pins 34 and a second pair of PLC pogo pins 36. When ring laser gyro block 10 is mounted to mounting plate 22, first PLC pogo pins 34 and second PLC pogo pins 36 make electrical contacts with a first PLC driver 40 and a second PLC driver 42, which are attached to ring laser gyro block 10. These PLC pogo pins (first pair 34 and second pair 36) allow for operation of first PLC driver 40 and second PLC driver 42.

To achieve proper alignment and positioning of ring laser gyro block 10 when attached to mounting plate 22, a first alignment pin 46 and a second alignment pin 48 are attached to mounting plate 22.

Figure 4:
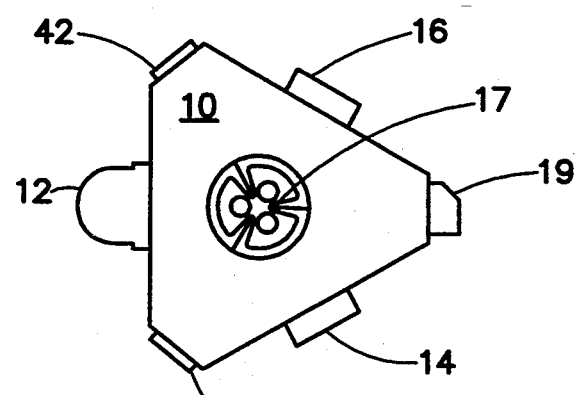
FIG. 4 is a top view of a ring laser gyroscope which is screened utilizing the screening device of the present invention.

To allow for attachment of ring laser gyro block 10 to mounting plate 22, there are a plurality of holes 50 bored into mounting plate 22. Holes 50 are drilled and tapped so as to allow a machine screw to be attached thereto. Holes 50 are positioned to allow attachment of a ring laser gyro block 10 with or without a dither spring or dither motor 17 attached. If the block has not reached a point at which dither motor 17 is attached, an adapter 52 is placed in the aperture 18 of ring laser gyro block 10. Screws are then connected to adapter 52. Alternatively, if the laser gyro has reached a point in its assembly wherein dither motor 17 is attached to block 10, mounting adapter 52 is removed and the dither motor 17 is attached directly to mounting plate 22. For reference, FIG. 4 illustrates a ring laser gyro block having the dither motor 17 already attached thereto. As can be seen by comparing FIG. 1 and FIG. 4, the hole pattern used to connect either adapter 52 or the dither motor 17 is identical.

Because the mounting plate and all elements attached thereto must be dithered or rotationally oscillated, it is important that the structure be inertially balanced. (Further discussion regarding dithering is contained in a subsequent portion of the present description.) Inertial balancing is accomplished by thinning of vertical member 32 as well as removing portions of mounting plate 22 to create apertures 56 therein.

Figure 3:
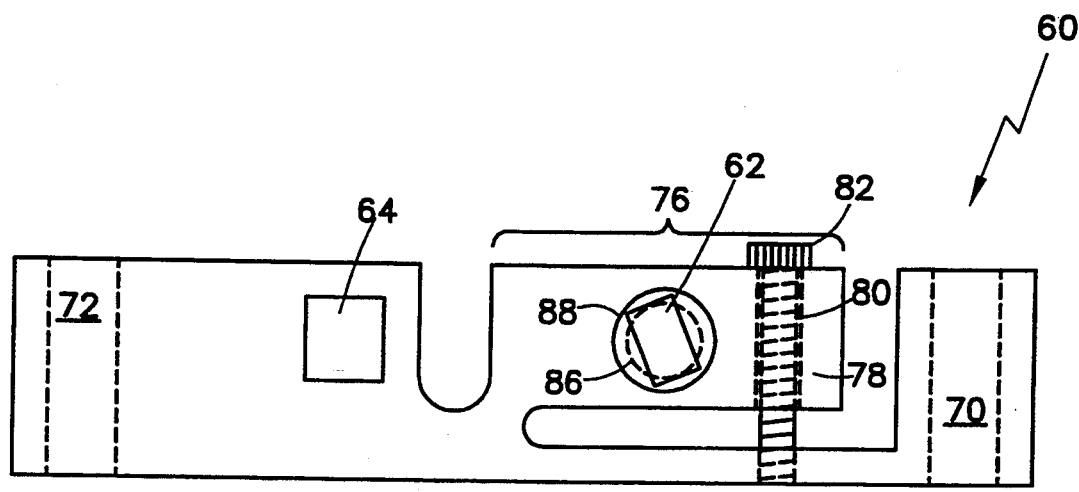
FIG. 3 is a frontal view of the sensor housing of the present invention.

At an end of mounting plate 22 opposite vertical structure 32, there is attached a sensor housing 60. FIG. 3 illustrates a front view of sensor housing 60. Continual reference should be made to FIGS. 1 and 2 which illustrate the interaction of sensor housing 60 with mounting plate 22 and ring laser gyro block 10. Attached to sensor housing 60 are two optical sensors; a first optical sensor 62 and a second optical sensor 64. In this particular application the first optical sensor or readout sensor 62 is used to detect the readout signals from ring laser gyro block 10. The second optical sensor or laser intensity sensor 64 (LIM sensor) is used to monitor the laser intensity of the gas discharge laser which exists within ring laser gyro block 10. As is understood by those skilled in the art, a wedge mirror 19 which is attached directly to ring laser gyro block 10 is used to direct appropriate signals to readout sensor 62 and LIM sensor 64.

Sensor housing 60 is adjustably attached to housing plate 22 via two mounting bolts 66 and 68. Mounting bolts 66 and 68 are inserted through apertures 70 and 72 contained in the sensor housing 60. Apertures 70 and 72 are formed large enough to allow sensor housing 60 to be positioned in a multitude of positions.

Referring to FIG. 3, sensor housing 60 has a number of voids therein so as to create a cantilevered portion 76. At the unattached end 78 of cantilevered portion 76, there exists a hole or aperture drilled vertically through cantilevered portion 76. This hole or aperture 80 allows an adjustment screw 82 to be placed therein, thus allowing adjustment of the position of cantilevered end 78.

Also positioned in cantilevered member 76 is a second horizontal aperture 86 in which is placed a rotatable readout mounting structure 88. Readout sensor 62 is attached to an inwardly facing surface of readout mounting structure 88. Mounting structure 88 allows readout sensor 62 to be rotated about the central axis of mounting structure 88 and positioned to appropriately receive the readout signals from wedge mirror 19. As understood by those skilled in the art, the rotation of readout sensor 62 allows for a proper phase alignment with the readout signal.

LIM sensor 64 is attached to sensor housing 60 at a point away from cantilevered member 76. The adjustment capabilities inherent in the mounting structure of sensor housing 60 (more specifically, aperture 70 and 72 in conjunction with mounting bolt 60 and 68), allows sufficient position adjustment of LIM sensor 64.

Referring now specifically to FIG. 2 where there is shown a side view of the screening device 20 of the present invention. Attached to mounting plate 22 is a dither motor adapter 92. Attached to dither motor adapter 92 is a dither motor 94 which is then attached to a stable base unit 96. The configuration of adapter 92 and dither motor 94 allows mounting plate 22 and all structures attached thereto to be rotationally oscillated or dithered with respect to base unit 96.

The components necessary to run ring laser gyro block 10 are all electrically connected to a set of run electronics 100. Run electronics 100 contain the necessary circuitry to power the gas discharge laser (i.e., to apply sufficient voltage between cathode 12 and anodes 14 and 16), to control the dither motor 94, to control the PLC drivers 40 and 42, and to receive signals from readout sensor 62 and LIM sensor 64. These connections are shown in FIG. 2.

It will be recognized by those skilled in the art that screening device 20 contains all necessary connections and equipment to operate a ring laser gyroscope. However, it is not necessary that all elements of the ring laser gyro be fully assembled. It is necessary that the ring laser gyroscope has cathode 12, anodes 14 and 16 attached thereto, as well as PLC drivers 40 and 42 and wedge mirror 19. The gyro can be operated at this state of assembly and can be tested for performance criteria using screening device 20. This allows the identification of performance problems at a point early on in the assembly of the ring laser gyroscope. This opportunity to test at this stage of assembly can eliminate the possibility of spending time and money to complete assembly of a badly performing ring laser gyroscope.

As was alluded to earlier, the gyro can be tested again using the screening fixture 20 at a point in which the dither motor 17 is attached thereto. To test the ring laser gyro at this point of assembly, external dither motor 94 which is attached to the base of mounting plate 22 is disabled while dither motor 17 is enabled. Therefore, a second performance screening can be accomplished at this point of assembly.

Lastly, once the gyro is assembled to the point in which the dither motor and readout sensors have been attached, the present invention can be used to screen performance once again. As previously mentioned, dither motor 94 is disabled while dither motor 17 is enabled and the readout sensors attached to wedge mirror 19 are connected to run electronics while readout sensors 62 and LIM sensor 64 attached to sensor housing 60 are disconnected from run electronics 100. Therefore, these same performance testing can be accomplished at this point of assembly. The testing of the gyro at this point in its assembly allows for a final check before the necessary electrical connections are hard wired to the components (e.g., before leads are soldered to the anodes.)

As will be recognized, the screening device 20 of the present invention is a valuable tool for use in the assembly and production of ring laser gyroscopes. Screening device 20 has the flexibility of testing gyro performance at numerous points during the assembly of the gyroscope. Furthermore, connection can be made to some elements without requiring the hard wiring of electrical leads thereto.

Having described the present invention in considerable detail, it will be understood that the method of the present invention can be altered without departing from its scope. We claim all modifications and alterations coming within the scope and spirit of the following claims.

What is claimed is:

1. A screening device for screening performance characteristics of a ring laser gyro, the screening device comprising:

a base plate;

a mounting plate for attachment to the ring laser gyro, the mounting plate having a plurality of alignment pins to force alignment of the ring laser gyro and an attachment means for attaching the ring laser gyro to the mounting plate;

a dither means attached to the base plate and the mounting plate for dithering the mounting plate with respect to the base plate;

a plurality of pogo pins attached to the mounting plate and positioned for making a plurality of electrical connections with the ring laser gyro;

a sensor housing for facilitating a plurality of optical sensors, the sensor housing having a means for adjustably positioning at least one of the optical sensors;

a first optical sensor attached to the sensor housing adjustable positioning means and positioned to receive a readout signal from the ring laser gyro when the ring laser gyro is attached to the mounting plate, the first optical sensor for producing an electrical signal indicative of the readout signal;

a second optical sensor attached to the sensor housing and positioned to receive a LIM signal from the ring laser gyro when the ring laser gyro is attached to the mounting plate, the second optical sensor for producing a electrical signal indicative of the LIM signal; and means for running the ring laser gyro and receiving the electrical signals from the first optical sensor and the second optical sensor.

2. The screening fixture of claim 1 wherein the sensor housing adjustable positioning means has a cantilevered portion and an adjustment means attached to the cantilevered end thereof, the first optical sensor is attached to the cantilevered portion thus allowing the position of the first optical sensor to be adjusted.

3. The screening fixture of claim 2 wherein the cantilevered portion has an aperture therein containing a rotatable mounting means, the first optical sensor being attached to the rotatable mounting means.

4. The screening fixture of claim 1 wherein the plurality of pogo pins include a cathode pin, a first anode pin a second anode pin, a first PLC pin and a second PLC pin.

5. The screening fixture of claim 1 wherein the means for running the ring laser gyro includes a first power supply for supplying a voltage signal to the ring laser gyro, a PLC control means for controlling the PLC, and a readout control means for receiving the electrical signal from the first optical sensor and outputting a signal corresponding to the ring laser gyro output.

6. A screening means for screening performance characteristics of a ring laser gyroscope while the gyroscope is at various stages of assembly, the screening means comprising:
   a mounting means for attaching a ring laser gyroscope block, the mounting means having alignment means for causing the block to be aligned in a predefined position;
   a dither means attached to the mounting means for rotationally oscillating the mounting means, the dither means having means for attachment to an inertially stable fixture;
   electrical connection means for making electrical connections to the gyroscope necessary to allow the gyroscope to operate;
   sensor housing means for facilitating optical sensors, the sensor housing means having a means for adjusting the position of at least a portion of the sensor housing means, the sensor housing means attached to the mounting means and positioned to receive optical signals output from the ring laser gyroscope;
   a first optical sensor means attached to the adjustable portion of the sensor housing means, the first optical sensor means for receiving a readout signal from the ring laser gyroscope; and
   a second optical sensor means attached to the sensor housing means for receiving a LIM signal from the ring laser gyroscope.

7. The screen means of claim 6 wherein the electrical connection means are pogo pins.

8. The screening fixture of claim 7 wherein the electrical connection means includes a cathode pin, an anode pin, and a PLC pin.

9. The screening means of claim 8 further comprising means to run the gyroscope, including a power supply to provide an electrical potential between the cathode pin and the anode pin, and means for controlling the path length by receiving a signal from the second optical sensor and providing an appropriate signal to the PLC pin.

10. The screening means of claim 6 wherein the adjustable portion of the sensor housing means is a cantilevered portion having an adjustment means attached to the unattached end of the cantilevered portion.

11. A screening device for screening the performance characteristics of a ring laser gyroscope having a block with a closed loop cavity therein, a cathode attached to the block and in communication with the cavity, an anode attached to the block and in communication with the cavity, a path length control transducer attached to the block, and a wedge mirror attached to the block for providing a LIM signal and a readout signal, the screening device comprising:
   a mounting plate for attaching the gyroscope thereto, the mounting plate having a plurality of alignment pins for causing the block to be positioned in a predefined position when attached to the mounting plate, the mounting plate further having a vertical member having a surface substantially perpendicular to the surface of the mounting plate;
   a plurality of pogo pins attached to the mounting plate, the pogo pins positioned to contact and provide electrical connection to the cathode, the anode, and the path length control transducer;
   a sensor housing adjustably attached to the mounting plate, the sensor housing having an adjustable portion;
   a LIM sensor attached to the sensor housing and positioned to receive a LIM signal from the laser gyroscope and produce an electrical signal indicative of the LIM signal;
   a readout sensor rotatably attached to the adjustable portion of the sensor housing and arranged to receive a readout signal from the gyroscope and produce an electrical signal indicative of the readout signal;
   a dither means attached to the mounting plate to rotationally oscillate the mounting plate; and
   electronics electrically attached to the plurality of pogo pins, the readout sensor, the LIM sensor, and the dither motor for providing power and control to the ring laser gyroscope to enable operation of the gyroscope.

12. The screening device of claim 11 wherein the electronics include a power supply to provide an electrical potential between the cathode and anode, a dither control means for energizing the dither means to rotationally oscillate the mounting plate, and a path length control means for receiving the LIM signal and adjusting the dimensions of the cavity using the path length control transducer to cause optical signals within the cavity to resonate at a maximum intensity.

13. The screening device of claim 11 wherein the adjustable portion of the sensor housing is a cantilevered portion having an adjustment screw at the unattached end of the cantilevered member.

14. The screening device of claim 11 wherein the sensor housing has a pair of apertures therein through which are inserted a pair of mounting bolts to provide attachment to the mounting plate, the apertures being large enough to allow the sensor housing to be positioned on the mounting plate in a multitude of positions.

15. The screening device of claim 11 wherein the sensor housing has a third aperture therein which extends parallel to the surface of the mounting plate, within the third aperture is a rotatable mounting means for supporting the readout sensor, the rotatable mounting member capable of being rotated about an axis extending through the third aperture.

* * * * *